(12) United States Patent
Okada et al.

(10) Patent No.: US 7,952,472 B2
(45) Date of Patent: May 31, 2011

(54) IN-VEHICLE DEVICE AND VEHICULAR COMBINED CONTROL SYSTEM

(75) Inventors: Noriaki Okada, Chiryu (JP); Masahiro Sugiura, Takahama (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 357 days.

(21) Appl. No.: 12/252,864

(22) Filed: Oct. 16, 2008

(65) Prior Publication Data

US 2009/0102634 A1     Apr. 23, 2009

(30) Foreign Application Priority Data

Oct. 18, 2007 (JP) .................................. 2007-271492

(51) Int. Cl.
*B60C 23/00* (2006.01)
*B60C 23/02* (2006.01)
(52) U.S. Cl. ........................................ 340/442; 340/447
(58) Field of Classification Search .................. 340/442, 340/447
See application file for complete search history.

(56) References Cited

U.S. PATENT DOCUMENTS

| | | | | |
|---|---|---|---|---|
| 5,463,374 A | * | 10/1995 | Mendez et al. | 340/442 |
| 6,650,236 B2 | * | 11/2003 | Ghabra et al. | 340/447 |
| 6,885,282 B2 | * | 4/2005 | Desai et al. | 340/5.61 |
| 7,026,953 B2 | * | 4/2006 | Fujii | 340/870.16 |
| 7,474,195 B2 | * | 1/2009 | Farrell | 340/5.72 |
| 7,650,864 B2 | * | 1/2010 | Hassan et al. | 123/179.2 |
| 2005/0191966 A1 | * | 9/2005 | Katsuta | 455/68 |
| 2007/0164876 A1 | * | 7/2007 | Ostrander et al. | 340/825.72 |
| 2008/0100429 A1 | * | 5/2008 | Luo et al. | 340/447 |
| 2008/0100430 A1 | * | 5/2008 | Kochie et al. | 340/447 |
| 2008/0150712 A1 | * | 6/2008 | Cooprider et al. | 340/447 |

FOREIGN PATENT DOCUMENTS

JP     2005-157511     6/2005

OTHER PUBLICATIONS

Japaneses Office Action dated Oct. 20, 2009, issued in corresponding Japanese Application No. 2007-271492, with English translation.

* cited by examiner

*Primary Examiner* — Travis R Hunnings
(74) *Attorney, Agent, or Firm* — Nixon & Vanderhye PC (57) ABSTRACT

A vehicular combined control system has functions of a smart entry system and a TPMS. A smart ECU turns on the output of a voltage signal terminal intermittently or in response to a given trigger. When the output of the voltage signal terminal turns on, a RF receiver section receives information from a portable device regardless of the ON/OFF state of an ignition switch to transmit the information to the smart ECU. When the ignition switch is ON and the output of the voltage signal terminal turns off, the RF receiver section receives information from tire sensors to transmit the information to a TPMS microcomputer.

8 Claims, 4 Drawing Sheets

IN-VEHICLE DEVICE AND VEHICULAR COMBINED CONTROL SYSTEM

CROSS REFERENCE TO RELATED APPLICATION

This application is based on and incorporates herein by reference Japanese Patent Application No. 2007-271492 filed on Oct. 18, 2007.

FIELD OF THE INVENTION

The present invention relates to an in-vehicle device for a vehicular combined control system having the function of a smart entry system and the function of a tire pressure monitoring system, and the vehicular combined control system having the in-vehicle device.

BACKGROUND OF THE INVENTION

In many vehicles, an in-vehicle device is mounted to conduct information transmission through a wireless communication with respect to another device to execute various controls.

As one of typical examples, a smart entry system is provided. This system includes an in-vehicle device that is mounted in the vehicle, and a portable device (mobile device) that is carried by a user of the vehicle. The smart entry system is so structured as to execute the control of the locking/unlocking operation of vehicle doors or an engine start without manual operation of a mechanical key, when an authentication is satisfied between the in-vehicle device and the portable device through the radio communication.

As another example, a tire pressure monitoring system (TPMS) includes an in-vehicle device that is mounted in the vehicle, and tire sensors that respectively detect the air pressure or temperature of tires of the vehicle.

The TPMS is structured, for example, in such a manner that the tire sensors located at the respective wheels of the vehicle detect the air pressures of the tires and transmit the detected data by electric waves, and the in-vehicle device receives the electric waves from the tire sensors to monitor the air pressures of the tires.

Further, in the system of that type which conducts the radio communication, it is proposed to integrate two different kinds of systems together into a combined system (for example, U.S. Pat. No. 7,026,953 corresponding to JP 3789335). This combined system functions as a remote keyless entry (RKE) system when an ignition is OFF (engine is not in operation), and functions as the TPMS when the ignition is ON (engine is in operation).

In the above combined system, the RKE system and the TPMS can share the same parts of the configuration of the in-vehicle device. This makes it easy to spatially mount the system in the vehicle, resulting in reduction of costs.

The combined system including the RKE system and the TPMS does not cause any disadvantage, even if the RKE system does not operate when the ignition is ON.

However, if the combined system is constructed to include the smart entry system and the TPMS, the combined system does not function as a smart entry system when the ignition is ON unlike the RKE system.

More specifically, in the case of the smart entry system, the radio communication is required to continue intermittently or on the basis of given triggers regardless of ON/OFF of the ignition, thereby monitoring whether the portable device exists within the vehicle, or is taken out to the exterior of the vehicle.

For this reason, as disclosed in U.S. Pat. No. 7,026,953, when the in-vehicle device focuses on controlling the function of the TPMS merely because the ignition turns on, the in-vehicle device is incapable of appropriately implementing the radio communication with the portable device, thereby making it impossible to confirm the presence of the portable device.

Accordingly, the combine system disclosed in U.S. Pat. No. 7,026,953 needs be improved.

SUMMARY OF THE INVENTION

It is therefore an object of the present invention to provide an in-vehicle device for a vehicular combined control system which is capable of appropriately controlling both of a function of a smart entry system and a function of a tire pressure monitoring system, and the vehicular combined control system having the in-vehicle device.

According to one aspect of the present invention, an in-vehicle device for a vehicular combined control system is configured to perform functions of a smart entry system and a tire pressure monitoring system. In the smart entry system, the in-vehicle device conducts radio communication with a portable device carried by a user of a vehicle to conduct authentication required to permit execution of predetermined controls in the vehicle. In the tire pressure monitoring system, the in-vehicle device conducts radio communication with tire pressure sensors thereby to acquire information related to the conditions of the tires. The in-vehicle device is configured to switch over any one of a first operation mode for receiving the information that is transmitted from the portable device, and a second operation mode for receiving the information that is transmitted from the sensors to output the information. The in-vehicle device is configured to switch over to the first operation mode when an output signal from the smart entry system turns on irrespective of ON/OFF condition of an ignition switch of the vehicle, and switch over to the second operation mode when the ignition switch of the vehicle is ON and the output signal from the smart entry system turns off. The in-vehicle device is configured to turn on the output signal intermittently or based on a given trigger, and input information from the portable device when the output signal turns on. The in-vehicle device is configured to input the information which is output from the sensors, when the ignition switch of the vehicle is ON and the output signal from the smart entry system is OFF.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
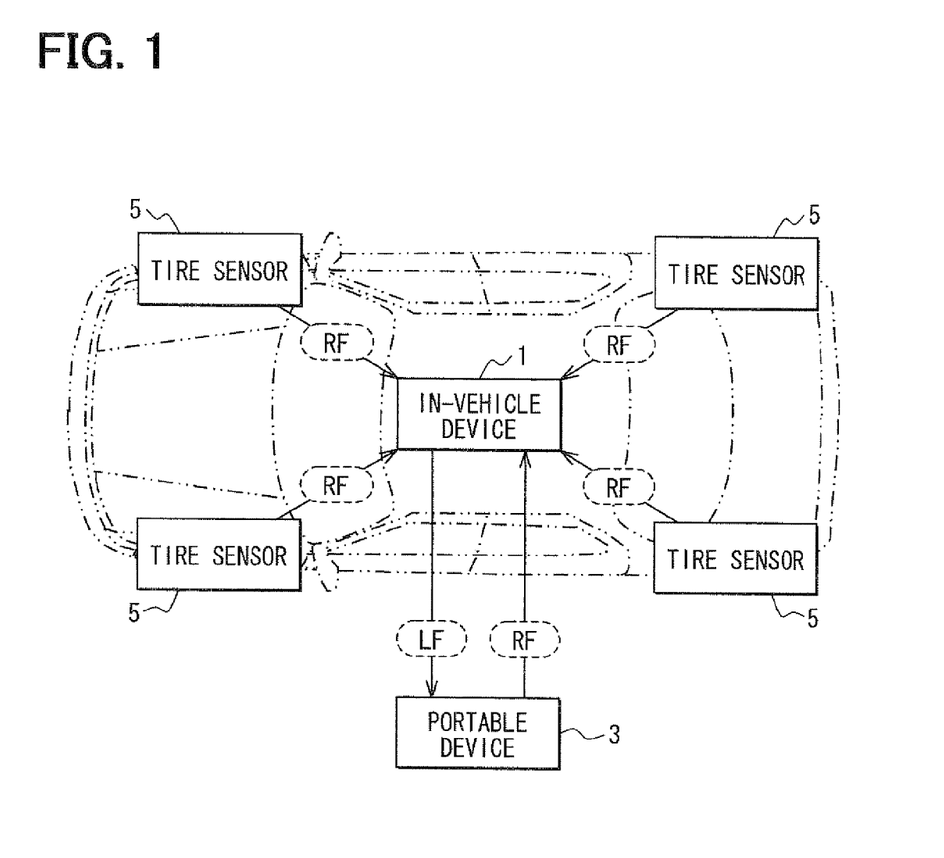
FIG. 1 is a block diagram showing a vehicular combined control system according to an embodiment of the present invention.

Referring first to FIG. 1, a vehicular combined control system includes an in-vehicle device 1 that is disposed in a vehicle, a portable device 3 that is carried by a user of the vehicle, tire sensors 5 that are incorporated into interiors of tires which are equipped in front/rear and right/left wheels of the vehicle as detecting means.

The in-vehicle device 1 is configured to control both of the function of a smart entry system and the function of a tire pressure monitoring system (TPMS).

The smart entry system conducts authentication by radio communication between the in-vehicle device 1 and a specific portable device 3 that is carried by an authorized user of the vehicle when the portable device 3 enters a radio communication area around the vehicle. When the authentication is approved, the smart entry system executes such a control that the unlock operation of locked vehicle doors or an engine start by the user is permitted. In the smart entry system, the in-vehicle device 1 transmits information to the portable device 3 by electric waves of a low frequency (LF) band. The portable device 3 transmits the information to the in-vehicle device 1 by electric waves of a radio frequency (RF) band.

On the other hand, the TPMS is configured to detect the conditions of tires of the vehicle by the tire sensors 5, and transmit the detected information to the in-vehicle device 1 through radio communication to inform a driver that the air pressure or temperature of any one of the tires is abnormal. In the TPMS, the four tire sensors 5 transmit the information to the in-vehicle device 1 by electric waves of RF band at such timing that the transmissions do not overlap each other.

That is, both of the portable device 3 and the tire sensors 5 execute the information transmission to the in-vehicle device 1 by the electric waves of the RF band. For this reason, the in-vehicle device 1 can receive the information that is transmitted from the portable device 3 and the tire sensors 5, respectively, when the in-vehicle device 1 can receive the electric waves of the RF band.

However, in order to prevent the information from the portable device 3 and the tire sensors 5 from being mixed together or interfered, the frequencies that are used by the portable device 3 and the tire sensors 5, respectively, are different from each other. In this embodiment, the frequency for the smart entry system is set at 312 MHz, and the frequency for the TPMS is set to 315 MHz. For this reason, the in-vehicle device 1 is so configured as to change between the receiving frequency for smart entry (smart frequency) and the receiving frequency for tire pressure monitoring (TPMS frequency).

The portable device 3 and the tire sensors 5 are different in the bit rate at the time of the information transmission from each other. More specifically, generally the bit rate at the time of the information transmission has a tendency to incur the deterioration of the sensitivity and the occurrence of communication error attributable to the sensitivity deterioration although the data communication can be more quickly conducted as the bit rate is higher.

In the case of the combined control system, the smart entry system performs the communication less number of times than the TPMS system, and the user's usability is remarkably lowered when the communication error occurs. Taking those points into consideration, the bit rate is set to a smart bit rate, which is a lower bit rate of, for example, 0.7 kbps, to thereby suppress the occurrence of the communication error.

On the other hand, the TPMS performs the communication more number of times than the smart entry system. Further, even if the communication error occurs at certain timing, this error will not become detrimental if the TPMS system can normally receive the information by the subsequent communication. Under the above circumstances, the bit rate is set to a TPMS bit rate, which is a higher bit rate of, for example, 5.0 kbps, thereby enabling the more quick communication to be implemented.

Figure 2:
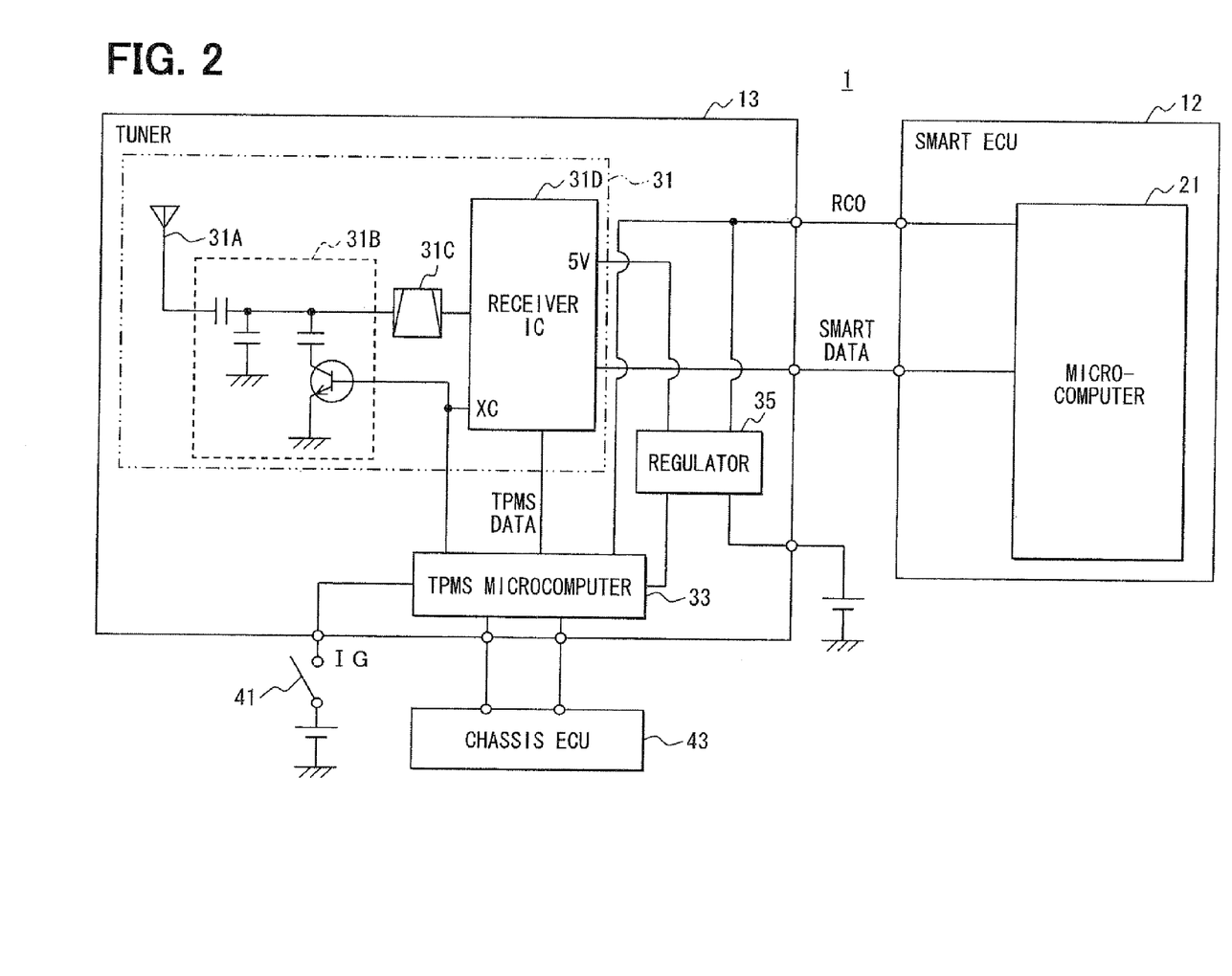
FIG. 2 is a block diagram showing a part of an in-vehicle device of the vehicle combined control system.

In the in-vehicle device 1, an LF transmitter system and a RF receiver system are provided. As shown in FIG. 2, the in-vehicle device 1 has a smart ECU 12 and a tuner 13. The smart ECU 12 has a microcomputer 21 that controls the function of the smart entry system. The tuner 13 includes an RF receiver section 31 that receives the electric waves of the RF band, a TPMS microcomputer 33 that controls the function of the TPMS, and a regulator 35 that applies a voltage to the RF receiver section 31. Further, the RF receiver section 31 includes an antenna 31A, an antenna matching switching circuit 31B, a filter 31C, and a receiver IC 31D. In addition, the TPMS microcomputer 33 inputs a signal from an ignition switch 41 connected to a battery, and conducts the input/output of data with respect to a chassis ECU 43.

Subsequently the functions of the respective sections of the in-vehicle device 1 are described with respect to a case (A) and case (B) where the ignition switch 41 is OFF and ON, respectively.

(A) Case in which the Ignition Switch 41 is OFF

When the ignition switch 41 is OFF, the TPMS microcomputer 33 is in a sleep state because of no power supply from the battery through the ignition switch 41. On the other hand, even if the ignition switch 41 is OFF, the in-vehicle device 1 must conduct the function of the smart entry system. Therefore, the in-vehicle device 1 intermittently executes the control of confirming whether the portable device 3 exists within radio communication area around the vehicle or not. For this reason, with the above control, the microcomputer 21 disposed in the smart ECU 12 intermittently turns on the output of a voltage signal terminal RCO.

In this case, the output signal from the voltage signal terminal RCO is input to both of the TPMS microcomputer 33 and the regulator 35.

However, in this case, since the TPMS microcomputer 33 is in the sleep state, a fact that the output from the voltage signal terminal RCO turns on is ignored by the TPMS microcomputer 33, and the TPMS microcomputer 33 continues to be in the sleep state.

On the other hand, when the output signal from the voltage signal terminal RCO is input to the regulator 35, a voltage of 5 V of a battery is applied to the receiver IC 31D through the regulator 35. The RF receiver section 31 operates when this voltage is applied to the RF receiver section 31 from the regulator 35, but stops the operation when the RF receiver section 31 does not receive the voltage supply from the regulator 35. For this reason, when the output signal from the voltage signal terminal RCO is input to the regulator 35, the receiver IC 31D comes to an operating state.

When the RF receiver section 31 operates, the RF receiver section 31 switches over the operation mode according to a mode switching signal that is output from the TPMS microcomputer 33. More specifically, when the mode switching signal that is output from the TPMS microcomputer 33 is OFF, the RF receiver section 31 receives the information that is transmitted from the portable device 3, and operates in a first operation mode which is output to the microcomputer 21.

On the other hand, when the mode switching signal that is output from the TPMS microcomputer 33 is ON, the TPMS microcomputer 33 receives the information that is transmitted from the tire sensors 5, and operates in a second operation mode which is output to the TPMS microcomputer 33.

However, in this example, since the TPMS microcomputer 33 is in the sleep state, the mode switching signal that is output from the TPMS microcomputer 33 is OFF. More specifically, the TPMS microcomputer 33 turns on the output of the mode switching signal when the TPMS microcomputer 33 comes to the active state, but the TPMS microcomputer 33 turns off the output of the mode switching signal when the TPMS microcomputer 33 comes to the sleep state.

For this reason, in this example, the RF receiver section 31 operates in the first operation mode. More specifically, the fact that the mode switching signal that is output from the TPMS microcomputer 33 is OFF is input to the antenna matching switching circuit 31B and the receiver IC 31D.

The antenna matching switching circuit 31B is switched to a circuit that adapts to the smart frequency used for the communication with the portable device 3 when the mode switching signal that is output from the TPMS microcomputer 33 is OFF. As a result, the antenna matching switching circuit 31B matches the smart frequency.

The receiver IC 31D has the receiving frequency switched to the smart frequency used for the communication with the portable device 3, when the mode switching signal that is output from the TPMS microcomputer 33 is OFF In addition, in the filter 31C, a cut-off frequency is changed to the setting corresponding to the smart bit rate. That is, the cut-off frequency of the filter 31C can be changed. When the smart bit rate is used, since the bit rate is lower than the TPMS bit rate, the cut-off frequency is set to be lower, to thereby more effectively cut off the noise components.

Further, the time constant of a comparator is changed to the setting corresponding to the smart bit rate, to thereby vary a reference at a time point that follows the smart bit rate. As a result, an optimum hysteresis corresponding to the smart bit rate is obtained.

When the above various settings are changed to the setting for smart entry system (smart setting) in the RF receiver section 31, the RF receiver section 31 comes to a state where the RF receiver section 31 operates in the first operation mode. As a result, the RF receiver section 31 receives the information that is transmitted from the portable device 3, and outputs the information (data) to the microcomputer 21. Accordingly, the microcomputer 21 of the smart ECU 12 is capable of acquiring the information that is transmitted from the portable device 3.

On the other hand, the microcomputer 21 of the smart ECU 12 turns off the output of the voltage signal terminal RCO at the time point when the microcomputer 21 obtains necessary information.

Next, a case in which the output signal from the voltage signal terminal RCO is OFF is described. The fact that the output signal from the voltage signal terminal RCO turns off is input to both of the TPMS microcomputer 33 and the regulator 35. In this example, since the TPMS microcomputer 33 is in the sleep state, the fact that the output from the voltage signal terminal RCO turns off is ignored by the TPMS microcomputer 33, and the TPMS microcomputer 33 continues to be in the sleep state.

On the other hand, the regulator 35 stops the voltage supply to the receiver IC 31D when the output signal from the voltage signal terminal RCO turns off. For this reason, the RF receiver section 31 also comes to the operation stop state. When the RF receiver section 31 comes to the operation stop state, the RF receiver section 31 stops the information reception from the portable device 3 and the output to the microcomputer 21.

The above operation is alternately repeated every time the microcomputer 21 of the smart ECU 12 intermittently switches the output of the voltage signal terminal RCO. Accordingly, the smart ECU 12 turns on the output of the voltage signal terminal RCO to operate the RF receiver section 31, thereby making it possible to input the information from the portable device 3 through the tuner 13. The smart ECU 12 turns off the output of the voltage signal terminal RCO to stop the operation of the RF receiver section 31, thereby making it possible to stop the input from the tuner 13.

(B) Case in which the Ignition Switch 41 is OFF

In the case where the ignition switch 41 turns on, the TPMS microcomputer 33 gets into an active state when the output signal from the voltage signal terminal RCO is OFF.

In the case that the voltage signal terminal RCO is OFF, the output signal from the TPMS microcomputer 33 that has gotten into the active state is input to the regulator 35, and the voltage of 5 V is applied to the receiver IC 31D through the regulator 35. That is, the regulator 35 also applies the voltage to the receiver IC 31D when the regulator 35 inputs the output signal from the voltage signal terminal RCO, even when no output signal from the TPMS microcomputer 33 is applied.

The RF receiver section 31 operates when the RF receiver section 31 receives the voltage supply from the regulator 35, and stops the operation when the voltage supply from the regulator 35 stops. For this reason, when the output signal from the TPMS microcomputer 33 is input to the regulator 35, the RF receiver section 31 gets into the operating state.

When the RF receiver section 31 operates, the RF receiver section 31 switches the operation mode according to the mode switching signal that is output from the TPMS microcomputer 33. In this example, since the TPMS microcomputer 33 is in the active state, the mode switching signal that is output from the TPMS microcomputer 33 is ON.

For this reason, the RF receiver section 31 operates in the second operation mode. More specifically, the fact that the mode switching signal that is output from the TPMS microcomputer 33 is ON is input to the antenna matching switching circuit 31B and the receiver IC 31D.

The antenna matching switching circuit 31B is switched to a circuit that adapts to the TPMS frequency used for the communication with the tire sensors 5 when the mode switching signal that is output from the TPMS microcomputer 33 is ON. As a result, the antenna matching switching circuit 31B matches the TPMS frequency.

The receiver IC 31D has the receiving frequency switched to the TPMS frequency used for the communication with the tire sensors 5 when the mode switching signal that is output from the TPMS microcomputer 33 is ON.

In addition, in the filter 31C, the cut-off frequency changes to the setting corresponding to the TPMS bit rate. Similarly, in the comparator (not shown), the time constant is changed to the setting corresponding to the TPMS bit rate.

When the above various settings are changed to the TPMS setting in the RF receiver section 31, the RF receiver section 31 gets into a state where the RF receiver section 31 operates in the second operation mode. As a result, the RF receiver section 31 receives the information that is transmitted from the tire sensors 5, and outputs the information to the TPMS microcomputer 33. Accordingly, the TPMS microcomputer 33 is capable of acquiring the information that is transmitted from the tire sensors 5.

Even when the ignition switch 41 is ON, the in-vehicle device 1 executes the control of confirming whether the portable device 3 exists within the radio communication area (for example, in the vehicle interior or around the vehicle) or not on the basis of a given trigger. For example, when the door is closed while the ignition is ON, the microcomputer 21 of the smart ECU 12 turns on the output of the voltage signal terminal RCO with a trigger that the door is closed, for the purpose of confirming whether the portable device 3 has been taken out to the exterior of the vehicle or not.

In the case in which the output signal from the voltage signal terminal RCO turns on, the output signal from the voltage signal terminal RCO is input to both of the TPMS microcomputer 33 and the regulator 35.

When the output signal from the voltage signal terminal RCO is input to the TPMS microcomputer 33, the TPMS microcomputer 33 shifts from the active state to the sleep state. When the TPMS microcomputer 33 shifts to the sleep state, the mode switching signal that is output from the TPMS microcomputer 33 turns off.

For this reason, the above various settings (receiving frequency, antenna matching, filter setting, and comparator setting) are changed to the setting for smart entry system in the RF receiver section 31, and the operation mode of the RF receiver section 31 changes from the second operation mode to the first operation mode. As a result, the RF receiver section 31 receives the information that is transmitted from the portable device 3, and outputs the information to the microcomputer 21. Accordingly, the microcomputer 21 of the smart ECU 12 is capable of acquiring the information that is transmitted from the portable device 3.

On the other hand, the microcomputer 21 of the smart ECU 12 turns off the output of the voltage signal terminal RCO at the time point of obtaining the necessary information.

Next, a case in which the output signal from the voltage signal terminal RCO turns off is described. In this case, the output signal from the voltage signal terminal RCO turns off and is input to both of the TPMS microcomputer 33 and the regulator 35.

When the output signal from the voltage signal terminal RCO turns off, the TPMS microcomputer 33 shifts from the sleep state to the active state. When the TPMS microcomputer 33 shifts to the active state, the mode switching signal that is output from the TPMS microcomputer 33 turns on.

For this reason, the above various settings (receiving frequency, antenna matching, filter setting, and comparator setting) are changed to the setting for TPMS in the RF receiver section 31, and the operation mode of the RF receiver section 31 changes from the first operation mode to the second operation mode. As a result, the RF receiver section 31 receives the information that is transmitted from the tire sensors 5, and outputs the information to the TPMS microcomputer 33. Accordingly, the TPMS microcomputer 33 is capable of acquiring the information that is transmitted from the tire sensors 5.

The above operation is alternately repeated every time the microcomputer 21 of the smart ECU 12 switches the output of the voltage signal terminal RCO on the basis of a given trigger. Accordingly, the smart ECU 12 turns on the output of the voltage signal terminal RCO to operate the RF receiver section 31 in the first operation mode, thereby making it possible to input the information from the portable device 3 from the tuner 13. When the smart ECU 12 also turns off the output of the voltage signal terminal RCO, the smart ECU 12 operates the RF receiver section 31 in the second operation mode. As a result, the TPMS microcomputer 33 is capable of inputting the information from the tire sensors 5 from the tuner 13.

Figure 3:
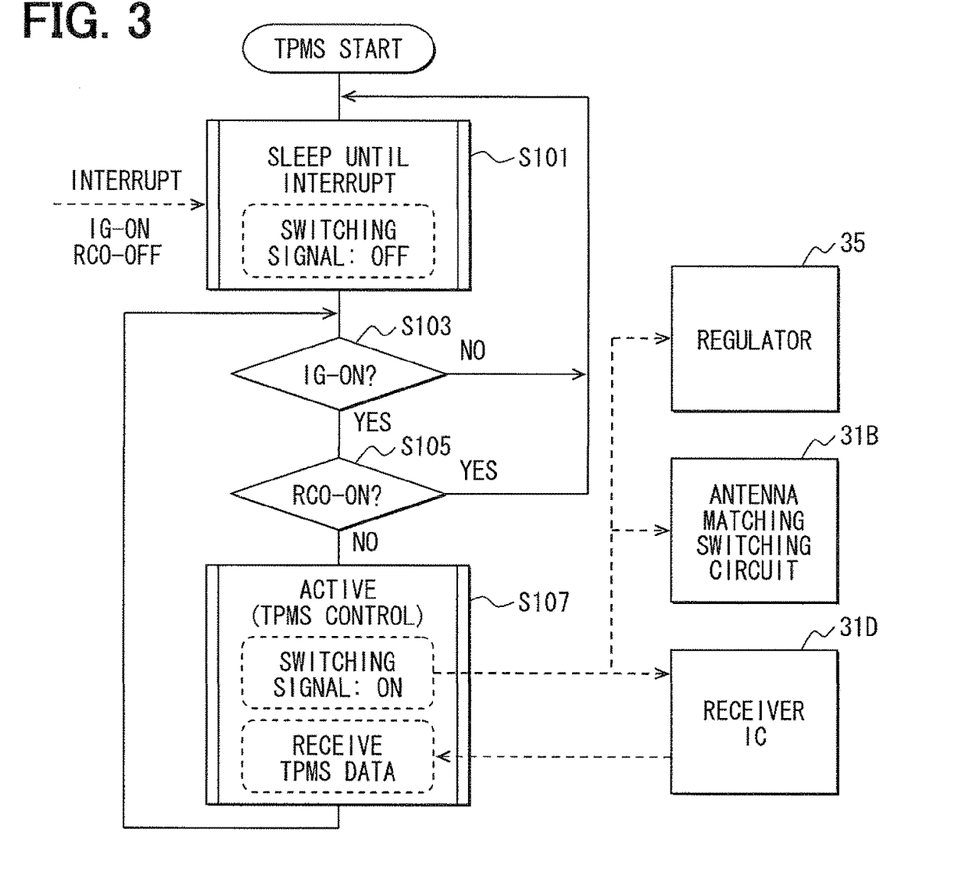
FIG. 3 is a flowchart showing control to be executed by a TPMS microcomputer, and input/output of signals accompanied by the control.

The TPMS microcomputer 33 is programmed to execute the control processing shown in FIG. 3, and the input/output of the signal accompanying the control.

The TPMS microcomputer 33 stands by in the sleep state until an interrupt signal (an on-signal from the ignition switch 41 (IG-ON), or an off-signal (RCO-OFF) from the voltage signal terminal RCO of the microcomputer 21 equipped in the smart ECU 12 arrives (S101). In this situation, the mode switching signal that is output from the TPMS microcomputer 33 is OFF.

On the other hand, when the interrupt signal arrives in a process of S101, the process of S101 is skipped and the TPMS microcomputer 33 confirms whether the ignition switch 41 is ON or not (S103). In this example, when the ignition switch 41 is ON (YES in S103), the TPMS microcomputer 33 confirms whether the output from the voltage signal terminal RCO of the microcomputer 21 equipped in the smart ECU 12 is ON or not (S105).

In the process of S105, when the output from the voltage signal terminal RCO is OFF (NO in S105), the TPMS microcomputer 33 gets into the active state, and executes the TPMS control (S107). In this situation, the mode switching signal that is output from the TPMS microcomputer 33 is ON. The mode switching signal is input to the regulator 35, the antenna matching switching circuit 31B, and the receiver IC 31D, and the RF receiver section 31 operates in the second operation mode. As a result, the TPMS microcomputer 33 acquires the information (data) that is transmitted from the receiver IC 31D.

Upon the completion of S105, the TPMS microcomputer 33 returns to the process of S103, and repeats the processes of S103 to S107 while the ignition switch 41 is ON (YES in S103) and the output from the voltage signal terminal RCO is OFF (NO in S105).

On the other hand, when the ignition switch 41 turns off while the processes of S103 to S107 are repeated, the TPMS microcomputer 33 returns to the process of S101. Also, the TPMS microcomputer 33 also returns to the process of S101 when the output from the voltage signal terminal RCO becomes ON while the processes of S103 to S107 are repeated (YES in S105).

When the TPMS microcomputer 33 returns to the process of S101, the TPMS microcomputer 33 gets into the sleep state, and that state continues until the interrupt signal arrives again.

Figure 4:
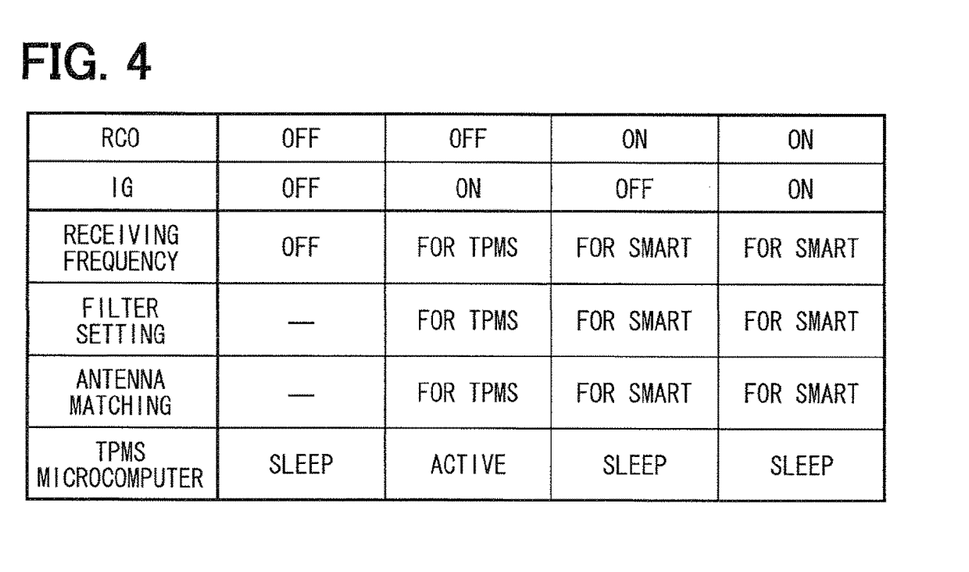
FIG. 4 is a table showing a list of input signals to a tuner and the statuses of respective sections.

States of input signal to tuner and respective sections are defined as shown in FIG. 4. The table in FIG. 4 indicates whether the receiving frequency of the receiver IC 31D, the setting of the filter 31C and the comparator, the antenna matching made by the antenna matching switching circuit 31B, and the operating state of the TPMS microcomputer 33 are switched over, according to the combination of the ON/OFF of the ignition switch 41 with the ON/OFF of the output from the voltage signal terminal RCO.

As understood in FIG. 4, in the in-vehicle device 1, when the ignition switch 41 is OFF, and the output from the voltage signal terminal RCO is OFF, the TPMS microcomputer 33 gets into the sleep state, and the signal reception made by the receiver IC 31D stops. As a result, in this case, the in-vehicle device 1 gets into a state where the power consumption is most suppressed.

On the other hand, when the output from the voltage signal terminal RCO turns on, the settings of the respective sections are switched to settings for the smart entry system regardless of the ON/OFF state of the ignition switch 41. More specifically, the receiving frequency of the receiver IC 31D is switched to the smart frequency, the settings of the filter 31C and the comparator are made for the smart entry system, and the antenna matching switching circuit 31B is also switched to a circuit that adapts to the smart frequency.

Accordingly, when the smart ECU 12 turns on the output from the voltage signal terminal RCO, the function of the smart entry system operates regardless of the ON/OFF state of the ignition switch 41. Similarly, in this case, the TPMS microcomputer 33 gets into the sleep state.

On the other hand, when the ignition switch 41 is ON, and the output from the voltage signal terminal RCO turns off, the settings of the respective sections are switched to settings for the TPMS. More specifically, the receiving frequency of the receiver IC 31D is switched to the TPMS frequency, the settings of the filter 31C and the comparator are made for the TPMS, and the antenna matching switching circuit 316 is switched to a circuit that adapts to the TPMS frequency. Also, in this case, the TPMS microcomputer 33 gets into the active state.

Accordingly, when the ignition switch 41 is ON, and the output from the voltage signal terminal RCO turns off, the TPMS function operates.

As described above, the operating states of the respective sections of the tuner 13 are switched over according to the input signal to the tuner 13 as shown in FIG. 4. In realizing the switching, this embodiment adopts a system in which the TPMS microcomputer 33 and the regulator 35 input the signal, and control the voltage supply to the receiver IC 31D and the ON/OFF operation of the mode switching signal. Alternatively, a circuit configuration other than the above configuration can be applied when the circuit configuration can realize the same switching operation. For example, even if a software control is not conducted by the TPMS microcomputer 33, hardware logic can be incorporated into the circuit to switch to the respective states shown in FIG. 4.

Figure 5:
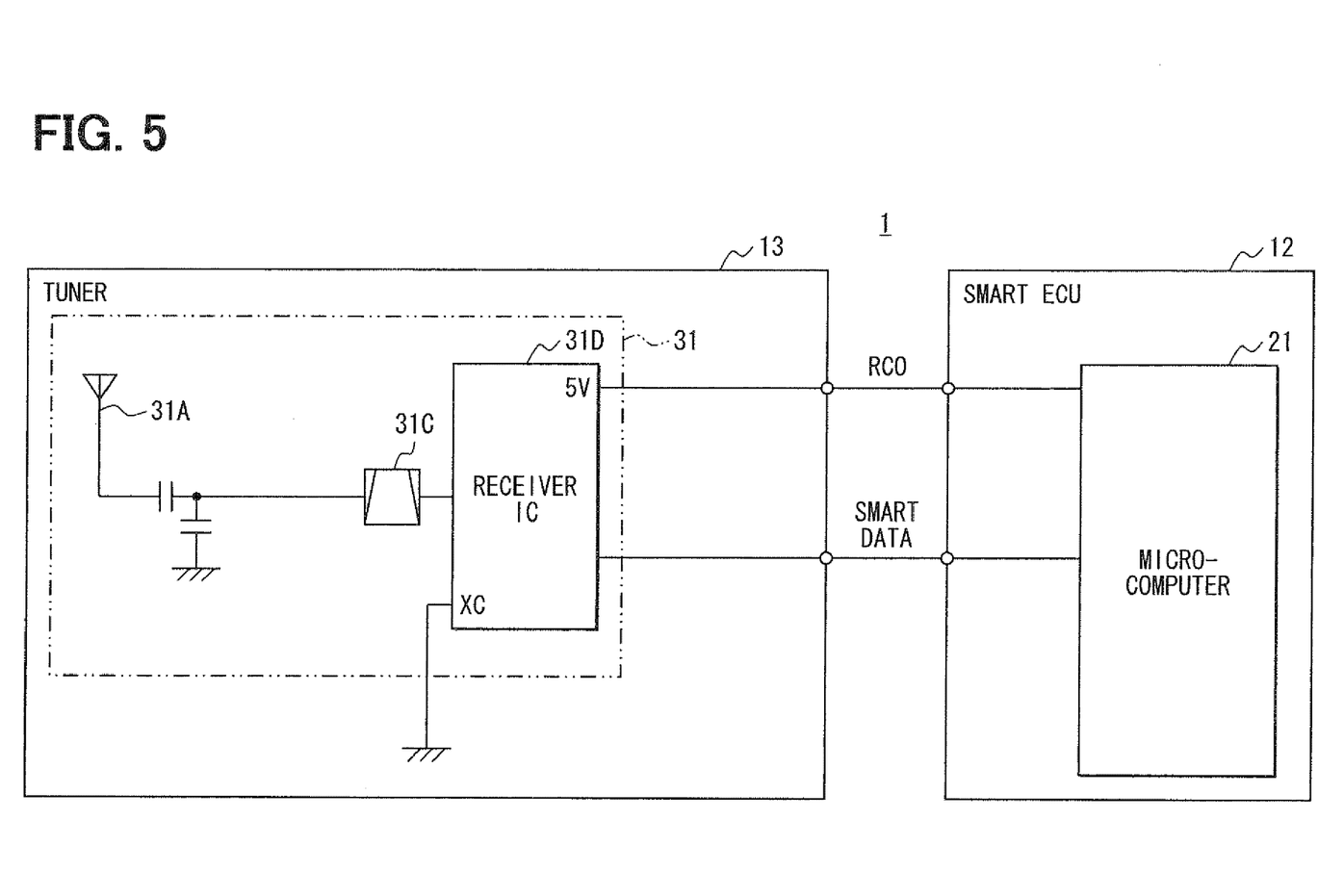
FIG. 5 is a block diagram showing an example of an in-vehicle device disposed in an existing system having only a smart entry function.

An exemplary in-vehicle device equipped in a smart entry system, which is a system having only the smart entry function, is shown in FIG. 5. The same configurations as those shown in FIG. 2 are denoted by the same or similar reference numerals.

In the in-vehicle device shown in FIG. 5, the receiver IC 31D supplies the received data to only the smart ECU 12, which is different in configuration from the in-vehicle device 1 (FIG. 2) which supplies the received data to the TPMS microcomputer 33.

Since the receiver IC 31D thus supplies the received data to only the smart ECU 12, the receiver IC 31D can be completely driven by the smart ECU 12. For this reason, the receiver IC 31D operates when the receiver IC receives the voltage supply from the voltage signal terminal RCO equipped in the smart ECU 12.

That is, in the above smart entry system, the voltage signal terminal RCO of the smart ECU 12 is originally so disposed as to apply the voltage to the receiver IC 31D.

On the contrary, in the in-vehicle device 1 shown in FIG. 2, the smart ECU 12 is completely identical in configuration with the existing smart entry system, and the voltage signal terminal RCO of the smart ECU 12 is used as a signal line for transmitting the operation of the smart entry system function to the tuner 13 from the smart ECU 12.

With the application of the above configuration, as is apparent from a comparison of FIG. 2 with FIG. 5, an interface between the smart ECU 12 and the tuner 13 (or the RF receiver section 31) is completely identical with the existing smart entry system. That is, the smart ECU 12 is completely identical with the system in the hardware configuration and specification regardless of the presence or absence of the TPMS function.

Accordingly, in the above in-vehicle device 1, the smart ECU 12 that is employed in the smart entry system of FIG. 5 can be used as it is. That is, the smart ECU 12 is combined with a device (=tuner 13 shown in FIG. 5) having the same function as that of a device that is adopted in the smart entry system, and can be used in configuring the smart entry system having no TPMS function.

As described above, according to the above embodiment of the in-vehicle combined control system, both of the function of the smart entry system and the function of the TPMS can be appropriately controlled.

Since the smart ECU 12 equipped in the in-vehicle device 1 can be shared as a part of the smart entry system having no configuration of the TPMS, a reduction in the costs can be performed by the mass production effects with the sharing, and the in-vehicle device 1 can be provided inexpensively as compared with the in-vehicle device that is designed for the system having the configuration of the TPMS.

The in-vehicle device 1 can save the power as compared with the device in which the RF receiver section 31 always continues to operate, since the RF receiver section 31 stops to operate in a period when the ignition switch 41 of the vehicle is OFF, and the output signal from the voltage signal terminal RCO is OFF.

In the in-vehicle device 1, when the ignition switch 41 of the vehicle turns on, or when the output signal from the voltage signal terminal RCO turns on, the regulator 35 supplies an electric power to the RF receiver section 31, and the RF receiver section 31 operates with the electric power. Accordingly, the RF receiver section 31 passively operates or stops to operate on the basis of whether the electric power is supplied from the regulator 35 or not. As a result, the RF receiver section 31 may not execute the power saving control by itself, and an advanced mechanism for executing the power saving control may not be equipped in the RF receiver section 31.

Also, in the in-vehicle device 1, the TPMS microcomputer 33 outputs the mode switching signal to the RF receiver section 31 when the ignition switch of the vehicle turns on, and the output signal from the voltage signal terminal RCO turns off. The RF receiver section 31 operates in the first operation mode when the mode switching signal is not output from the TPMS microcomputer 33 in supplying the electric power from the regulator 35 to the RF receiver section 31. Also, the RF receiver section 31 operates in the second operation mode when the mode switching signal is output from the TPMS microcomputer 33 in supplying the electric power from the regulator 35 to the RF receiver section 31.

Accordingly, the RF receiver section 31 can change over between the first or second operation mode to be operated on the basis of only the presence or absence of the mode switching signal. Hence, a mechanism in which the first or second operation mode is determined according to the combination of the state of the ignition switch of the vehicle with the presence or absence of the output signal from the smart ECU 12 may not be equipped in the RF receiver section 31.

Also, in the in-vehicle device 1, the TPMS microcomputer 33 gets into the active state or the sleep state, and outputs the mode switching signal to the RF receiver section 31 when the TPMS microcomputer 33 gets in the active state.

Accordingly, the power saving can be performed in shifting to the sleep state as compared with a case in which the TPMS microcomputer 33 does not shift to the sleep state. Moreover, when the TPMS microcomputer 33 shifts to the active state, information from the RF receiver section 31 is output, and the TPMS microcomputer 33 can acquire the information.

The above description has been given of the embodiment of the present invention. However, the present invention is not limited to the above specific embodiment, but can be implemented in other various configurations.

For example, the above embodiment shows an example in which the smart bit rate is lower than the TPMS bit rate as the bit rate in conducting the information transmission. However, the present invention is not limited to the above configuration, and the respective bit rates can be arbitrarily selected. Also, since the respective bit rates can be arbitrarily selected, the setting of the filter 31C can be appropriately optimized.

As a specific example, the smart bit rate may be identical with the TPMS bit rate, and in this case, the characteristic of the filter 31C and the characteristic of the comparator may not be adjustable.

What is claimed is:

1. An in-vehicle device for a vehicular combined control system, comprising:
   first control means configured for a smart entry system and to conduct radio communication with a portable device carried by a user of a vehicle to conduct authentication required to permit execution of predetermined controls in the vehicle;
   second control means configured for a tire pressure monitoring system and to conduct radio communication with tire pressure detecting means thereby to acquire information related to the conditions of the tires from the detecting means; and
   receiving means configured to switch over any one of a first operation mode for receiving information that is transmitted from the portable device to output the information to the first control means, and a second operation mode for receiving the information that is transmitted from the detecting means to output the information to the second control means,
   wherein the receiving means is configured to switch over to the first operation mode when an output signal from the first control means turns on irrespective of ON/OFF condition of an ignition switch of the vehicle, and switch over to the second operation mode when the ignition switch of the vehicle is ON and the output signal from the first control means turns off,
   wherein the first control means is configured to turn on the output signal intermittently or based on a given trigger, and input information from the portable device which is output from the receiving means when the output signal turns on,
   wherein the second control means inputs the information from the detecting means which is output from the receiving means, when the ignition switch of the vehicle is ON and the output signal from the first control means is OFF, and
   wherein the receiving means is configured to stop operation, when the ignition switch of the vehicle turns off and the output signal from the first control means turns off.

2. The in-vehicle device according to claim 1, further comprising:
   power supplying means configured to supply electric power required to operate the receiving means to the receiving means, when the ignition switch of the vehicle turns on or the output signal from the first control means turns on.

3. The in-vehicle device according to claim 2, wherein:
   the second control means is configured to output a mode switching signal to the receiving means, when the ignition switch of the vehicle turns on and the output signal from the first control means turns off; and
   the receiving means is configured to operate in the first operation mode when the mode switching signal is not output from the second control means in supplying the electric power from the power supplying means to the receiving means, and operate in the second operation mode when the mode switching signal is output from the second control means.

4. The in-vehicle device according to claim 3, wherein:
   the second control means is configured to get into an active state when the ignition switch of the vehicle turns on and the output signal from the first control means turns off, and get into a sleep state that can suppress the power consumption more than the active state when the ignition switch of the vehicle turns off and the output signal from the first control means turns on, and
   the second control means is configured to output the mode switching signal to the receiving means when the second control means gets into the active state.

5. The in-vehicle device according to claim 1, wherein:
   the receiver means is configured to receive the information of the portable device at a first receiving frequency in the first operation mode and the information of the tire pressure detecting means at a second receiving frequency in the second operation mode, the first receiving frequency being lower than the second receiving frequency.

6. The in-vehicle device according to claim 1, wherein:
   the receiver means is configured to receive the information of the portable device in the first operation mode in less number of times than receiving the information of the tire pressure detecting means in the second operation mode.

7. The in-vehicle device according to claim 1, wherein:
   the receiver means is configured to receive the information of the portable device at a first bit rate in the first operation mode and the information of the tire pressure detecting means at a second bit rate in the second operation mode, the first bit rate being lower than the second bit rate.

8. A vehicular combined control system comprising: an in-vehicle device according to claim 1;
   the portable device; and
   the detecting means.

* * * * *